United States Patent
Chakhaiyar et al.

(10) Patent No.: US 8,694,723 B2
(45) Date of Patent: Apr. 8, 2014

(54) METHOD AND SYSTEM FOR COUPLING SERIAL ATTACHED SCSI (SAS) DEVICES AND INTERNET SMALL COMPUTER SYSTEM INTERNET (ISCSI) DEVICES THROUGH SINGLE HOST BUS ADAPTER

(75) Inventors: Madhukar Gunjan Chakhaiyar, Bihar (IN); Mahmoud K. Jibbe, Wichita, KS (US)

(73) Assignee: LSI Corporation, San Jose, CA (US)

( * ) Notice: Subject to any disclaimer, the term of this patent is extended or adjusted under 35 U.S.C. 154(b) by 169 days.

(21) Appl. No.: 13/096,126

(22) Filed: Apr. 28, 2011

(65) Prior Publication Data

US 2012/0278551 A1 Nov. 1, 2012

(51) Int. Cl.
*G06F 13/12* (2006.01)
*G06F 13/36* (2006.01)

(52) U.S. Cl.
USPC .......................................... 711/114; 710/315

(58) Field of Classification Search
USPC .......................................... 710/315; 711/114
See application file for complete search history.

(56) References Cited

U.S. PATENT DOCUMENTS

| | | | |
|---|---|---|---|
| 7,886,105 B2 | 2/2011 | Stevens | 710/313 |
| 7,917,682 B2 | 3/2011 | Bakthavathsalam | 710/315 |
| 2006/0004935 A1* | 1/2006 | Seto et al. | 710/62 |
| 2007/0174851 A1 | 7/2007 | Smart | 719/324 |
| 2007/0294459 A1 | 12/2007 | Chen | 710/315 |
| 2008/0244139 A1* | 10/2008 | Nakajima | 710/300 |
| 2009/0003361 A1* | 1/2009 | Bakthavathsalam | 370/401 |
| 2010/0122027 A1* | 5/2010 | Onabe et al. | 711/114 |
| 2010/0169589 A1 | 7/2010 | Jalali | 711/162 |

* cited by examiner

*Primary Examiner* — April Y Blair
*Assistant Examiner* — Michael C Kolb
(74) *Attorney, Agent, or Firm* — Christopher P. Maiorana, PC

(57) ABSTRACT

An apparatus comprising an interface, a first port, and a second port. The interface may be configured to connect to a host computer. The first port may be configured to connect to a first set of storage devices using a first protocol. The second port may be configured to connect to a second set of storage devices using a second protocol. The apparatus may provide support for the first protocol and the second protocol to allow communication using both the first protocol and the second protocol through the interface.

8 Claims, 6 Drawing Sheets

METHOD AND SYSTEM FOR COUPLING SERIAL ATTACHED SCSI (SAS) DEVICES AND INTERNET SMALL COMPUTER SYSTEM INTERNET (ISCSI) DEVICES THROUGH SINGLE HOST BUS ADAPTER

FIELD OF THE INVENTION

The present invention relates to data storage generally and, more particularly, to a method and/or apparatus for coupling serial attached SCSI (SAS) devices and internet small computer system internet (iSCSI) devices through a single host bus adapter.

BACKGROUND OF THE INVENTION

Conventional storage infrastructures are migrating to support Serial Attached SCSI (SAS) infrastructures as well as internet SCSI (iSCSI) storage infrastructures through a gigabit Ethernet medium. A host server computer in such a system uses two Host Bus Adapters (HBAs)—one for coupling to the SAS storage device and another for coupling to the iSCSI connected storage devices. Using two HBAs on two different PCI slots consumes processor computational resources of the host server computer. In order to manage SAS devices as well as iSCSI devices, separate management applications and failover drivers are needed. Such duplication can complicate the management process as well as drain processor computational resources of a host server computer.

It would be desirable to implement a method and/or system for implementing a serial attached SCSI (SAS) and/or Internet small computer system interface (iSCSI) controller through a single host bus adapter (or controller drive interface).

SUMMARY OF THE INVENTION

The present invention concerns an apparatus comprising an interface, a first port, and a second port. The interface may be configured to connect to a host computer. The first port may be configured to connect to a first set of storage devices using a first protocol. The second port may be configured to connect to a second set of storage devices using a second protocol. The apparatus may provide support for the first protocol and the second protocol to allow communication using both the first protocol and the second protocol through the interface.

The objects, features and advantages of the present invention include providing a method and system for coupling a first device (e.g., serial attached SCSI (SAS)) device and a second device (e.g., an Internet small computer system interface (iSCSI)) device through a single host bus adapter that may (i) consume less resources from a host server or a computer processor, (ii) reduce the number of cables from two to one (e.g., the iSCSI cable is better known/tested/verified than the SAS cable), (iii) simplify customer setups for a connection and Internet knowledge points of view, (iv) reduce the number of failover drivers that are needed to certify a product (e.g., less interoperability recipes), (v) simplify the customer configuration in debugging media issues, (vi) implement a Wide Area Network (WAN) emulator and/or cable test tools for iSCSI, (vii) provide a single PCI slot to connect a SAS Controller/iSCSI Host Bus Adapter, (viii) be cost effective by using a single HBA to serve the purpose of two HBAs with different protocol capabilities, (ix) implement a single storage management software application to handle SAS as well as iSCSI devices, (x) allow SAS devices to be a part of the iSCSI network (e.g., the distance limitation for SAS devices gets eliminated with iSCSI sub-system delivery module), (xi) offer significant benefits in enterprise IT environments (e.g., reduced power consumption, increased performance, efficient use of enterprise resources and/or reduced total cost of ownership, etc.), (xii) allow point-to-point connectivity for SAS devices and be scalable over Ethernet or iSCSI SAN infrastructure, and/or (xiii) couple an SAS Controller/iSCSI Host Bus Adapter to connect multiple SAS or SATA devices.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

With enterprise storage needs escalating and becoming more complex, factors such as larger capacity, scalability and processing power of host server computer are becoming more critical. In an enterprise computing environment, a host server may connect and directly access multiple storage device to support high bandwidth data transfer, system expansion, modularity, configuration flexibility and/or optimization of resources. The present invention may provide a host bus adapter (e.g., HBA) for coupling both serial attached SCSI (e.g., SAS) and Internet SCSI (e.g., iSCSI) storage devices to a host server (or computer). The combined SAS-iSCSI HBA (or controller drive interface) may be deployed to support multiple SAS device/disks coupled to a redundant array of independent drives (e.g., RAID) or disk controller circuit on the HBA and/or support externally coupled iSCSI storage devices coupled to the same RAID controller on the HBA. The host server or computer may become a part of an iSCSI environment without distance restrictions (e.g., SAS supports point-to-point connectivity) and take full advantage of the distances available with the existing network infrastructure and scalability. A single controller drive interface may include SAS-iSCSI deployment and may save a host server computer processor resources and/or help balance I/O loads.

Figure 1:
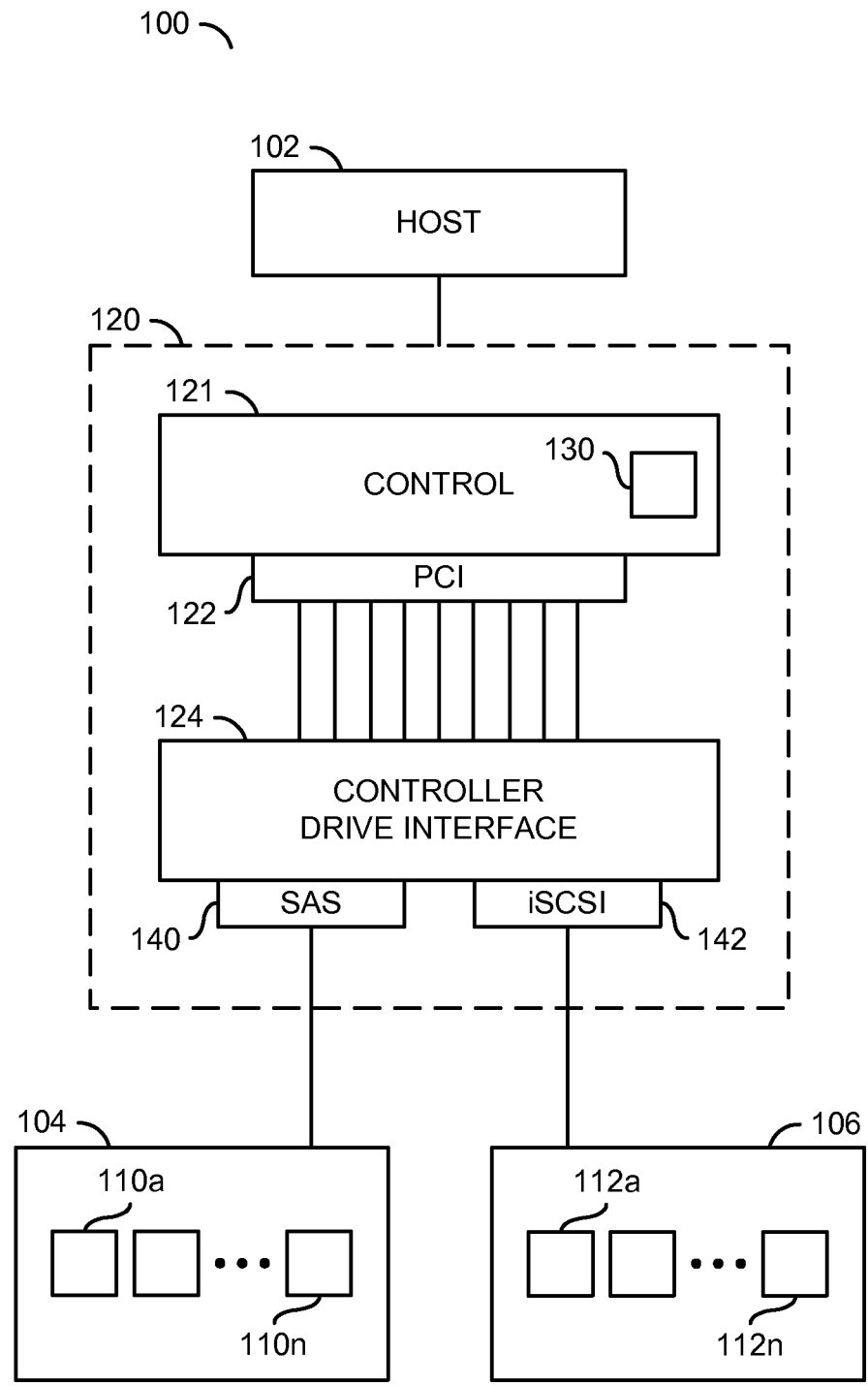
FIG. 1 is a block diagram of the present invention.

Referring to FIG. 1, a block diagram of a system 100 is shown in accordance with a preferred embodiment of the present invention. The system 100 generally comprises a block (or circuit) 102, a block (or circuit) 104, a block (or circuit) 106, and a block (or circuit) 120. The block 102 may be implemented as a host (or server). The block 104 may be implemented as a drive array. The block 106 may be implemented as a drive array. The block 120 may be implemented as a controller. In one example, the drive array 104 may comprise a number of devices 110a-110n of a first type. In one example, the devices 110a-110n may be implemented as SAS devices. For example, the devices 110a-110n may be implemented to operate using a SAS protocol. In one example, the block 106 may include a number of devices 112a-112n of a second type. In one example, the devices 112a-112n may be implemented as iSCSI devices. For example, the devices 110a-110n may be implemented to operate using an iSCSI protocol.

The controller 120 may include a block (or circuit) 121, a block (or circuit) 122, and a block (or circuit) 124. The circuit 121 may include a block (or module) 130. The module 130 may be implemented as firmware (e.g., software, code, etc.). The module 130 may be code configured to be executed by a processor circuit. In one example, the block 130 may be implemented as hardware, software, or a combination of hardware and/or software.

The circuit 120 may be implemented as a controller. In one example, the circuit 120 may be implemented as a RAID controller. The circuit 122 may be implemented as an interface. In one example, the circuit 122 may be implemented as a PCI interface slot. In another example, the circuit 122 may be implemented as a PCI bus that may be implemented internally on the controller 120. The circuit 124 may be implemented as a controller drive interface (or a host bus adapter). In one example, the circuit 124 may be a drive controller interface and/or host bus adapter configured to operate as both a first protocol (e.g., an SAS protocol) and a second protocol (e.g., an iSCSI protocol).

The circuit 124 may include a block (or module) 140 and a block (or module) 142. The block 140 may be implemented as an interface circuit (or port). The block 142 may be implemented as an interface circuit (or port). In one example, the interface 140 may be implemented as an interface configured to support a SAS protocol. In one example, the interface 142 may be implemented to support an iSCSI protocol.

Storage systems often include one device capable of bidirectional communication with another device. One device includes a computer node having a drive interface and the other end include storage device. The drive interface and storage device function as a transmitting and/or receiving device in order to exchange data and/or commands with each other using communication protocol. Typically each drive interface and/or mass storage device is capable of communicating using single communication protocol.

In general, the circuit 124 may be a controller drive interface that may support both SAS and/or iSCSI storage devices and/or protocols. While SAS and/or iSCSI devices are described as a first and/or a second protocol, other protocols may be implemented to meet the design criteria of a particular implementation. The circuit 124 may support the SAS devices 110a-110n coupled to the redundant array of inexpensive disks (e.g., RAID) controller circuit 120. The circuit 124 may support externally coupled iSCSI storage devices connected to the same RAID controller 120. The SAS devices 110a-110n may be connected to the controller 120 through the port 140 and may exchange information using SAS protocol. The system 100 may also be configured to translate information exchanged between the SAS port 140 and the other storage device (e.g., the iSCSI port 142 and the devices 112a-112n). A conversion of protocols and/or formats may be implemented in the module 130 while keeping data intact.

Figure 2:
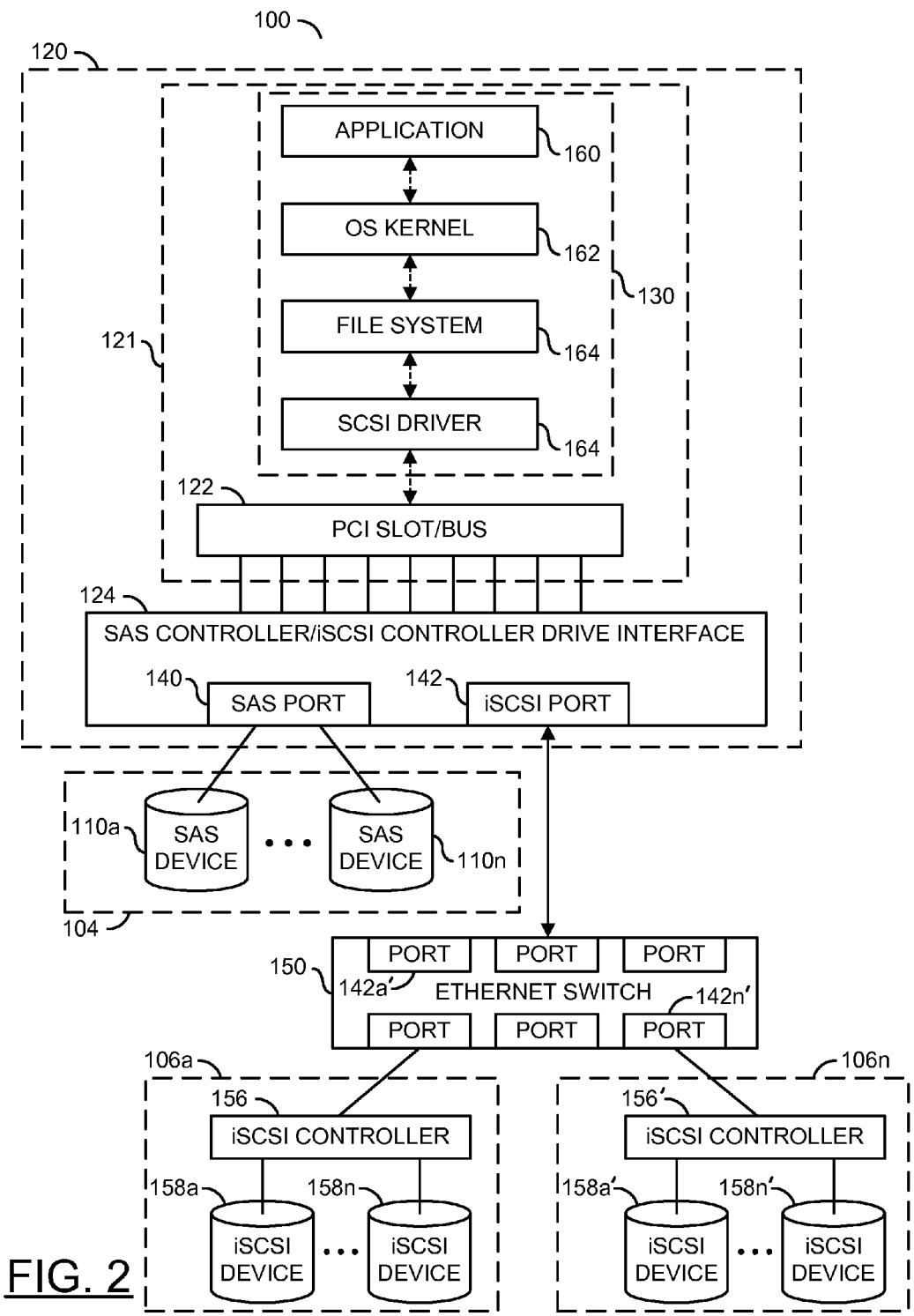
FIG. 2 is a more detailed block diagram of the present invention.

Referring to FIG. 2, a diagram illustrating additional details of the system 100 is shown. The system 100 further includes a block (or circuit) 150. The circuit 150 may be implemented as a switch. The iSCSI port 142 of the circuit 124 may be coupled to the switch 150. In one example, the switch 150 may be implemented as an Ethernet switch. The switch 150 may be connected to a number of the drive arrays 106a-106n. Each of the drive arrays 106a-106n generally comprises a block (or circuit) 156 and a number of drives 158a-158n. The circuit 156 may be a controller circuit configured to control access (e.g., I/O requests) to the drives 158a-158n. In one example, the drives 158a-158n many be implemented as iSCSI devices. The SAS port 142 is shown, as an example, connected to a number of the SAS devices 110a-110n.

The firmware 130 may include a block (or module) 160, a block (or module) 162, and a block (or module) 164. The module 160 may be implemented as an application module. The module 162 may be implemented as an operating system kernel module. The module 164 may be implemented as a file system module. The module 164 may be implemented as a SCSI driver module.

The storage management application module 160 may support operating system issues and/or functional requests (e.g., creation of RAID volumes, etc.). The operating system module 162 may invoke the kernel module. The kernel module 162 may send I/O requests to the file system module 164 on an as-needed basis. Otherwise, the kernel module 162 may connect to the SCSI driver module 164 to issue the SCSI command for the request generated by the management application module 160. The PCI slot 122 may act as a channel to carry one or more SCSI requests to the HBA circuit 124. The circuit 124 may be connected/inserted into the slot 122. The controller circuit 120 may understand a command and/or find one of the devices 106a-106n and/or 110a-110n intended to be associated with the command. If a particular SCSI command is intended for one of the SAS devices 110a-110n, the command may be directly communicated the particular one of the SAS devices 110a-110n connected to the SAS port 140 using serial SCSI protocol (e.g., SSP). Otherwise, the command may be directed to the iSCSI portion of the HBA circuit 124 for further processing.

One or more of the SAS devices 110a-110n may be connected directly to the SAS controller port 140. In one example, an SAS expander (not shown) may connect a plurality of the SAS drives 110a-110n to the port 140. The iSCSI port 142 may have similar connections. The port 142 may be connected directly to the arrays 106a-106n, or may be connected via the Ethernet switch 150. Having the user connectivity via the Ethernet switch 150, a plurality of iSCSI ports 142a'-142n' may be connected.

Figure 3:
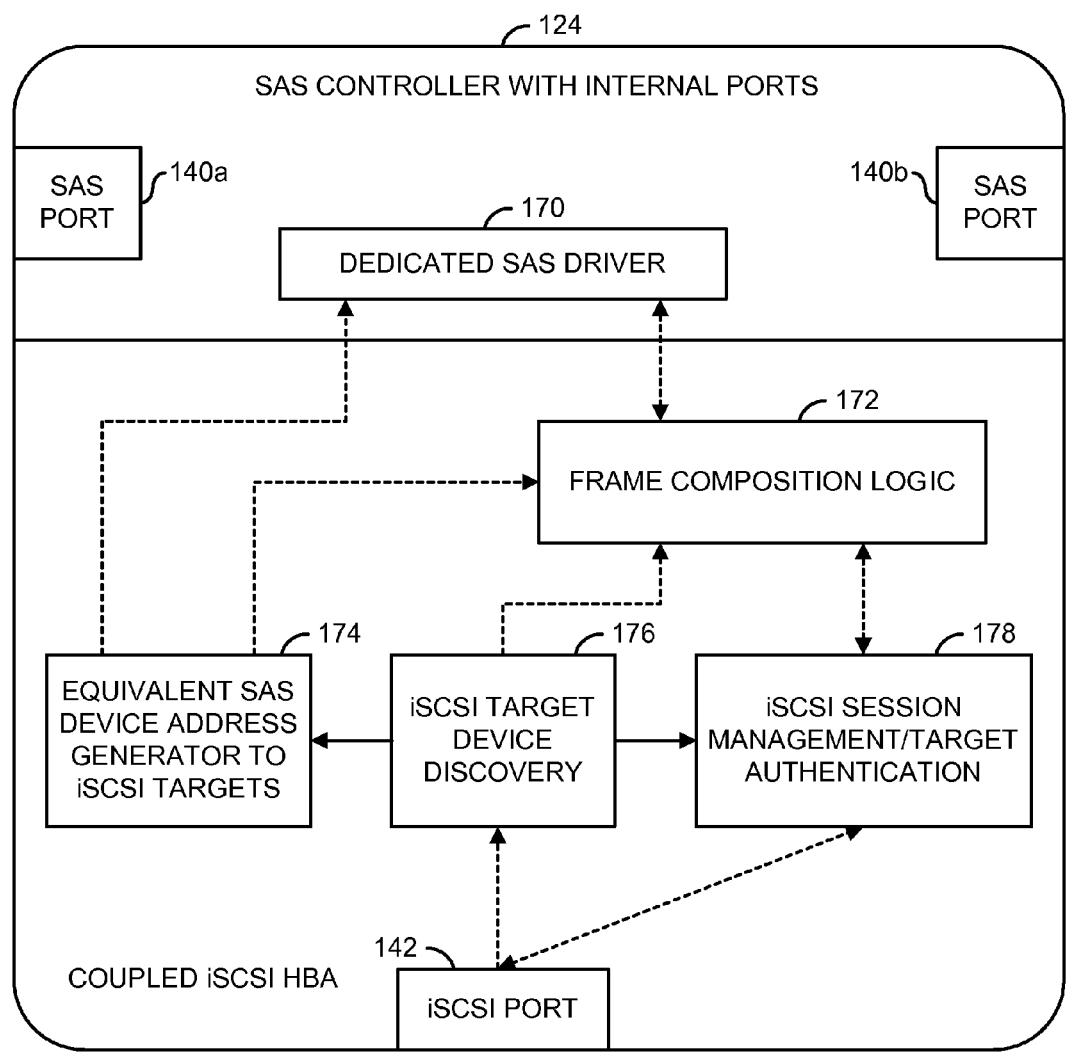
FIG. 3 is a diagram of an example of a controller in accordance with the present invention.

Referring to FIG. 3, a more detailed diagram of the circuit 124 is shown. The circuit 124 is shown having a port 140a, a port 140b and a port 142. The ports 140a and 140b may be configured as SAS ports. The port 142 may be configured as an iSCSI port. The circuit 124 generally comprises a block (or module) 170, a block (or module) 172, a block (or module) 174, a block (or module) 176, and a block (or module) 178. The module 170 may be implemented as a dedicated SAS driver module. The module 172 may be implemented as a frame composition logic module. The module 174 may be implemented as an equivalent SAS device address generator to iSCSI targets module. The module 176 may be implemented as an iSCSI target device discovery module. The module 178 may be implemented as an iSCSI session management/target authentication module. The dedicated device driver 170 may provide connection information with frame composition logic along with the module 174.

The HBA 124 may help the host computer server 102 utilize a single dedicated SAS driver 170 for adjoining storage device (e.g., devices 110a-110n and/or devices 112a-112n) to the operating system of the host computer 102. The dedicated SAS driver 170 may provide interaction with the SAS port 140 as well as with iSCSI portions of the HBA circuit 124.

The controller drive interface circuit 124 may communicate between the iSCSI controller 156 and/or devices 158a-158n and the dedicated SAS driver 170. The circuit 124 may establish a connection between the SAS RAID controller circuit 120 and/or provide exchange of protocol communication information.

The frame composition logic module 172 may implement logic configured to provide frame construction (e.g., SAS as well as iSCSI) and/or routing to a proper destination. The module 174 may provide translation of information to be sent to the SAS storage controller 124. By providing such translation, the host computer 102 may interact with the SAS storage devices 110a-110n through the controller drive interface 124 and/or the iSCSI storage devices 158a-158n similar to the interaction with the SAS/SATA storage devices 110a-110n.

Figure 4:
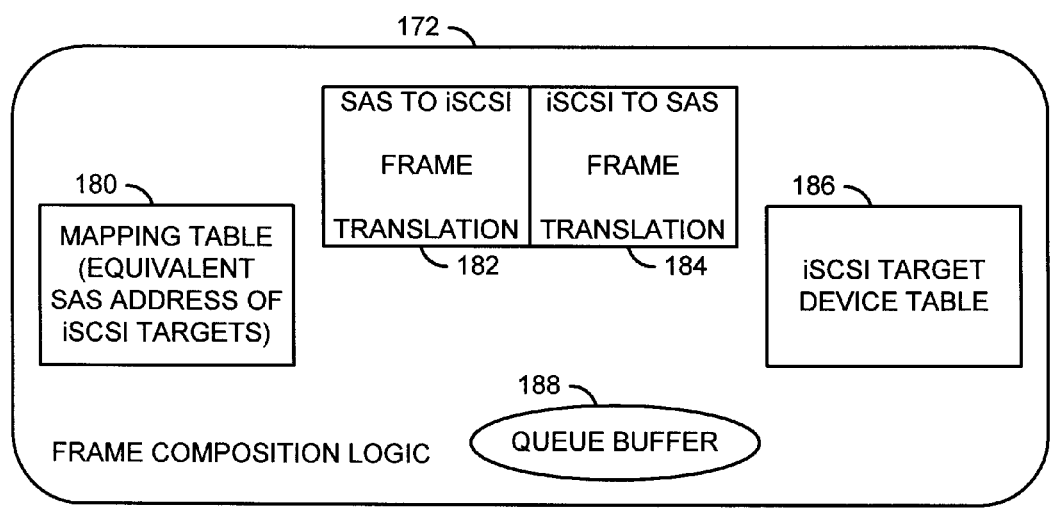
FIG. 4 is a diagram of frame composition logic.

Referring to FIG. 4, a more detailed diagram of the frame composition logic module 172 is shown. The circuit 172 generally comprises a block (or module) 180, a block (or module) 182, a block (or module) 184, a block (or module) 186, and a block (or module) 188. The module 180 may be implemented as a mapping table. The mapping table 180 may comprise an equivalent SAS address of iSCSI targets. The module 182 may be implemented as a SAS to iSCSI frame translation module. The module 184 may also be implemented as an iSCSI to SAS frame translation module. The module 186 may be implemented as a mapping table. In one example, the mapping table 186 may be implemented as a iSCSI target device table. The module 188 may be implemented as a queue buffer.

The module 172 may establish a conversation between the controller 120 and the iSCSI HBA 124. To establish the communication link, the module 174 normally first gathers a iSCSI target device list (e.g., with the help of device discovery module 176, which is normally connected to iSCSI port 142). Once a target is discovered, the frame composition logic 172 may create a table 180 which may be updated when any of the iSCSI target devices 158a-158n are added and/or removed. Since the SAS controller 124 normally only understands the SAS address format (or protocol), the equivalent SAS device address generator to iSCSI target module 174 may generate equivalent and/or virtual SAS address for the iSCSI targets 158a-158n. The frame composition logic module 172 may extract the equivalent and/or virtual SAS address of the iSCSI target 158a-158n and/or create the mapping table 180 for routing frames to appropriate destinations. The frame composition logic module 172 may be coupled to the SAS storage controller circuit 120 and/or coupled to the iSCSI host bus adapter circuit 124.

The translation module 174 may be adapted to intercept exchanges from the storage controller interface 124 (e.g., iSCSI host bus adapter circuit 124). The translation module 174 may be further adapted to translate the intercepted frame exchanges between SAS protocols and iSCSI protocols. The SAS to iSCSI Frame translation module 182 may convert incoming SAS frames received in iSCSI protocol format from the controller drive interface 124. The module 182 may incorporate proper iSCSI target device addresses to the iSCSI frame using the mapping table 180. The reverse operation may be performed by the iSCSI to SAS Frame translation module 184, where the iSCSI frame from the controller drive interface 124 (e.g., iSCSI protocol format) is converted to SAS protocol format. Equivalent SAS target device addresses may be sent with the SAS frame using information from the mapping table 180. The queue buffer 188 may be used to store and/or queue the incoming SAS-iSCSI frames and/or release the frames one by one for processing.

Referring back to FIG. 3, the module 178 may be implemented as an iSCSI session management/target authentication logic module. The module 178 may provide security with logic configured to authenticate target entities before allowing the target entities to establish connections with iSCSI HBA and/or initiator 102. For example, an iSCSI HBA (or initiator) may perform and authentication exchange with the iSCSI array controller 120 in order to authenticate the genuine target, or vice versa. The authentication type may be vendor specific or based on implementation (e.g., NONE, CHAP, Kerberos etc.). The iSCSI session management module 178 may be responsible for establishing connection with the target ports and allowing the initiator 102 to establish session with targets 106a-106n. The module 178 may keep track of each session and corresponding iSCSI connections to maintain the iSCSI traffic on the lane. The system 100 may restrict out of order frame exchange between the initiator 102 and the targets 106a-106n. During the session establishment, iSCSI session management may confirm the target regarding an in order frame exchange and the type of authentication after login process is completed.

The module 176 may be implemented as an iSCSI target device discovery module. The module 176 may be responsible for looking over the target device mapped to the circuit 124 or to the host 102. To monitor the status (e.g., offline, online, etc.) of the target device 106a-106n connected to the initiator 102, the module 176 may continuously (e.g., regularly) ping the Ethernet switch target port to determine the target device connected to the iSCSI array controller 120. The module 176 may also supervise the status (e.g., offline, online, etc.) of a volume or a Logical Unit Number (LUN) associated to the iSCSI HBA or host 102. This information may then be transferred to the equivalent SAS device address generator to iSCSI targets module 174 and/or the frame composition logic module 172.

The module 174 may be implemented as an equivalent SAS device Address Generator to iSCSI Targets module. Since the iSCSI target devices 106a-106n connected to the interface circuit 124 generally follow the standard iSCSI addressing format (e.g., iSCSI qualified name (iqn) or IEEE EUI-64 (eui) format), the iSCSI addresses are generally converted to an equivalent SAS address in order to establish communication with the SAS RAID controller 120. The module 174 may extract the discovered iSCSI target device address information and create an equivalent SAS address. The equivalent SAS address generation of the iSCSI target module 174 may be an internal operation of the controller drive interface 124. The device 174 may be used to establish communication between the SAS RAID controller 120 and the iSCSI target device 106a-106n. Once the equivalent SAS address is generated, the information may be passed to the frame composition logic module 172. The module 172 may assist in creating the device mapping table 180 for the routing of frames and/or the dedicated SAS driver 170.

The module 170 may be implemented as a dedicated SAS driver. The module 170 may be accountable for triggering the operation as per instructed by SAS RAID controller 120. The module 170 may act as a channel (or bridge) between iSCSI HBA and SAS RAID controller 120 to exchange information and frames. The dedicated SAS driver 170 generally extracts the discovered target device in SAS addressing format from the module 174 to send to the SAS RAID controller 120. The module 170 may also exchange the SAS frames to the SAS RAID controller 120 and/or frame composition logic module 172.

Figure 5:
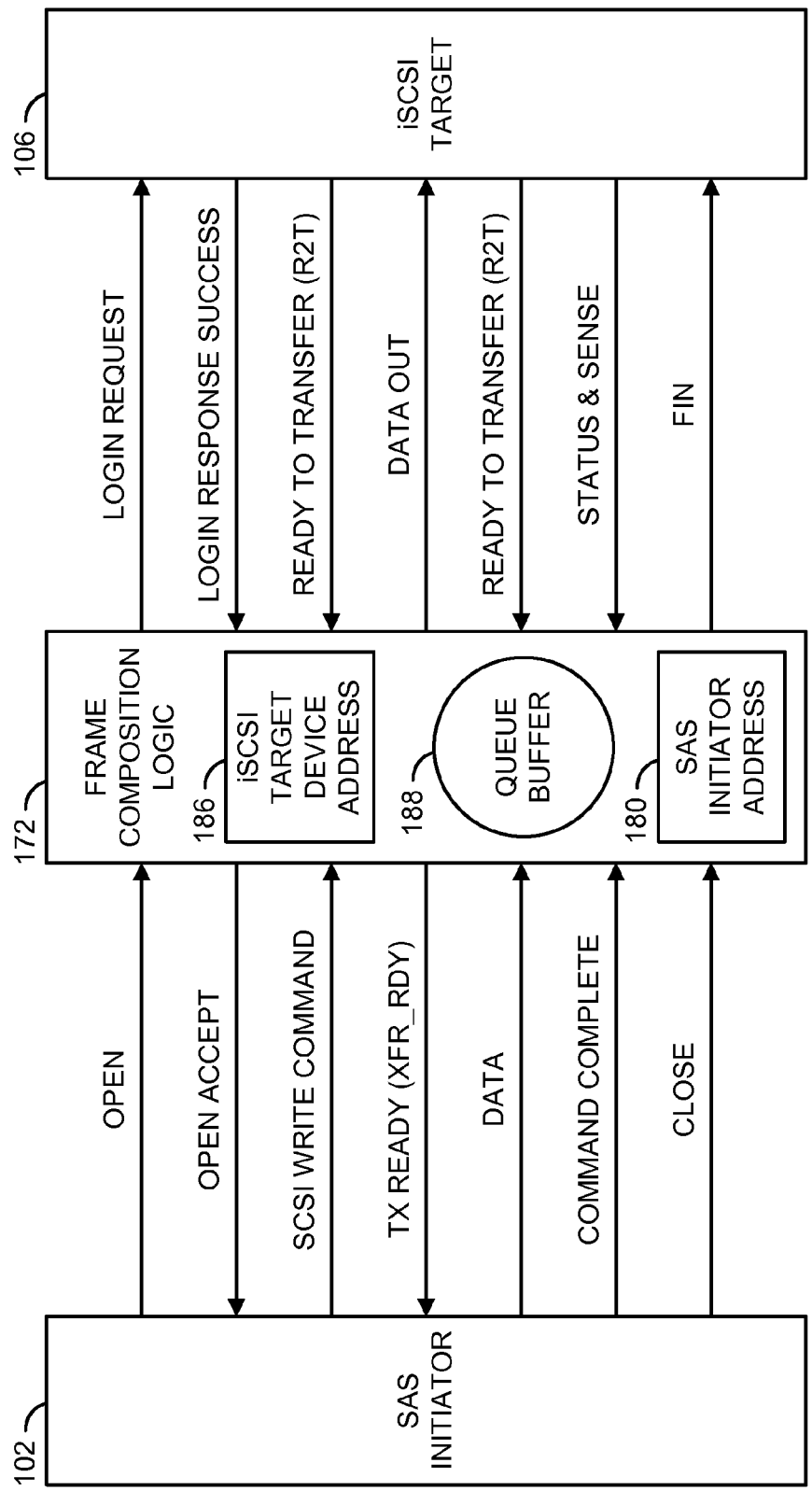
FIG. 5 is a diagram illustrating the exchange of login and write frames.

Referring to FIG. 5, a diagram illustrating a sequence of frame exchange for an initiator to target (write) is shown. One or more frames may be exchanged between the initiator device 102 and the target device 106. In a first, two way communication, the SAS initiator 102 may send a login request (e.g., OPEN) to the target device 106. The target device 106 may hold the SAS address format. The frame composition logic 172 may extract an equivalent iSCSI address from the mapping table 180 and/or the mapping table 186 and send the login request to the iSCSI target device 106 in iSCSI login frame format. The target device 106 may respond to the login request, which may convert an equivalent SAS frame format OPEN ACCEPT to be passed on to the SAS initiator 102. In order to process data writes, the SAS initiator 102 may issue a SCSI write command (e.g., the signal SCSI WRITE COMMAND) to the iSCSI target 106. In response the iSCSI target 106 may issue the signal READY TO TRANSFER, which may convert an equivalent SAS frame format transfer ready (e.g., XFR_RDY) to be passed on to the SAS initiator 102. The SAS initiator 102 may start sending data to the iSCSI target 106. Once writing data to the target 106 is completed, the SAS initiator 102 may send the signal COMMAND COMPLETE. The signal STATUS may then be sent by the iSCSI target 106 to the SAS initiator 102. After receiving the signal STATUS, the SAS initiator 102 may issue a CLOSE command frame to the iSCSI target 106, which may convert the equivalent iSCSI frame format FIN to be sent to the iSCSI target 106. The queue buffer 188 may be used to accumulate the other commands in queue to process one-by-one.

Figure 6:
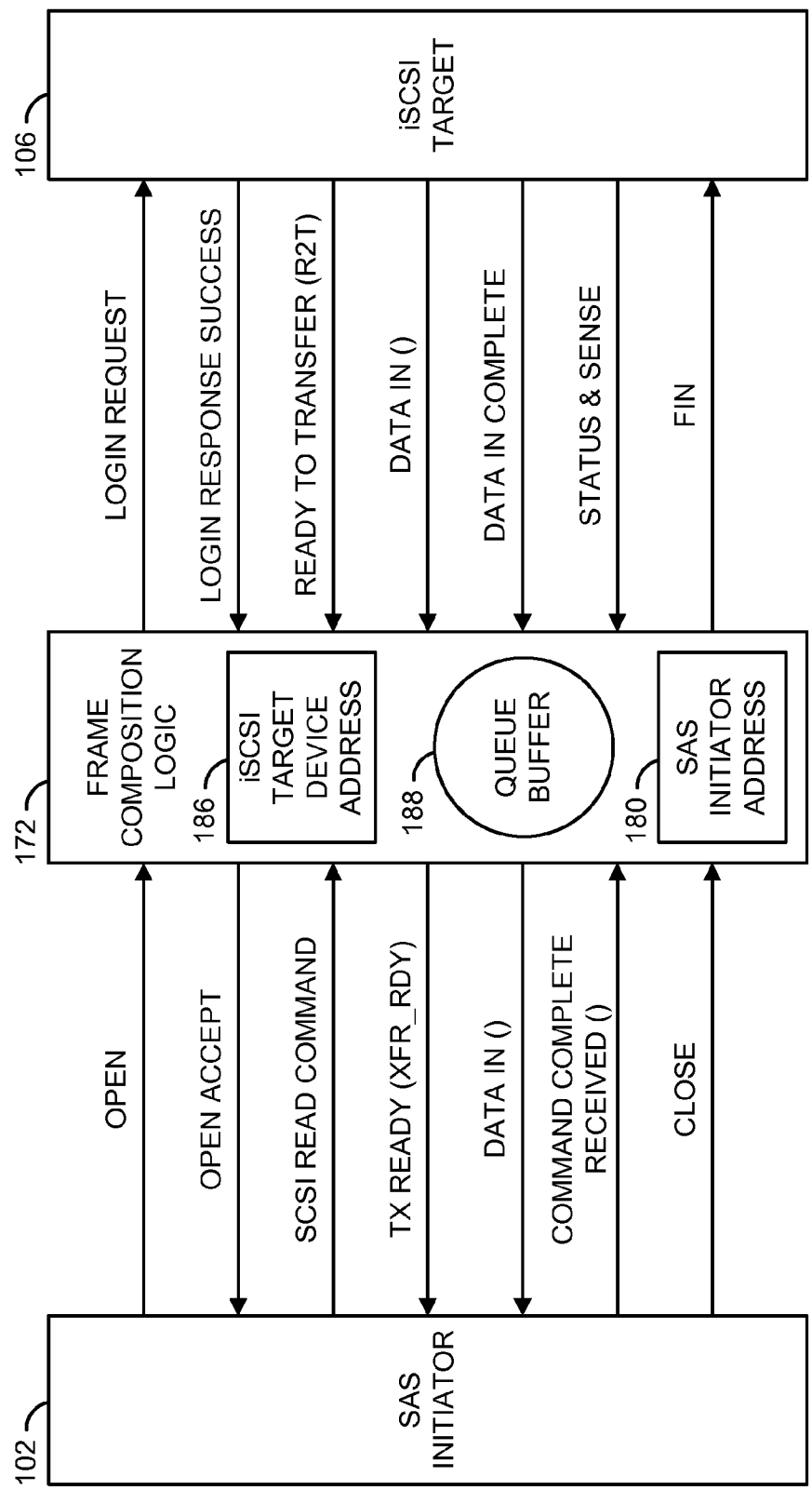
FIG. 6 is a diagram illustrating the example of login and read frames.

Referring to FIG. 6, a diagram illustrating a sequence of an initiator read to target is shown. To start the read process, the SAS initiator 102 may send a login request to the target device 106 which holds the SAS address format. The frame composition logic 172 may extract an equivalent iSCSI address from the mapping table 180 and/or the mapping table 186 and may also send the login request to the iSCSI target device 106 in an iSCSI login frame format. The iSCSI target device 106 may respond with a login response signal SUCCESS, which may be converted to an equivalent SAS frame format OPEN ACCEPT. The signal OPEN ACCEPT may be passed on to the SAS initiator 102. To start the read process, the SAS initiator 102 may issue the signal SCSI READ to the iSCSI target 106. The iSCSI target 106 may then issue a READY TO TRANSFER command. The signal READY TO TRANSFER may be converted to an equivalent SAS frame format TRANSFER READY (e.g., XFR_RDY) to be passed on to the SAS initiator 102. The iSCSI target 106 may transfer the data with the 'DATA IN ( )' frame to the SAS initiator 102. Once reading data from the target 106 is completed, the iSCSI target 106 may send the signal DATA IN COMPLETE, which may be converted to an equivalent SAS frame format COMMAND COMPLETE RECEIVED and passed on to the SAS initiator 102. After reading the data from the target 106, the iSCSI target 106 may send the signal STATUS to the SAS initiator 102. After receiving the signal STATUS, the SAS initiator 102 may issue a CLOSE command frame to the iSCSI target 106 which may be converted to an equivalent iSCSI frame format FIN. The signal FIN may be passed on to the iSCSI target device 106.

The functions performed by the diagrams of FIGS. 3-6 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:
1. An apparatus comprising:
a drive controller interface configured to connect to a host computer through a bus;
a first port configured to connect to a first set of storage devices using a SAS protocol; and a second port configured to connect to a second set of storage devices using a iSCSI protocol, wherein (i) said apparatus provides support for said SAS protocol and said iSCSI protocol to allow communication using both said SAS protocol and said iSCSI protocol through said drive controller interface, (ii) said communication is provided through a single drive controller interface, (iii) said apparatus implements support for both said SAS protocol and said iSCSI protocol by implementing (a) a mapping table to provide an equivalent SAS address of an iSCSI target, (b) a SAS to iSCSI frame translation module and (c) an iSCSI to SAS frame translation module.

2. The apparatus according to claim 1, wherein said apparatus provides said communication using said iSCSI protocol through an Ethernet switch to said second set of storage devices comprising a plurality of iSCSI devices through said device controller interface.

3. The apparatus according to claim 1, wherein said bus comprises a PCI slot.

4. The apparatus according to claim 1, wherein said bus comprises an internal PCI interface bus.

5. The apparatus according to claim 1, wherein said drive controller interface is configured to couple said apparatus to said first set of drives and said second set of drives.

6. The apparatus according to claim 5, wherein said drive controller interface is used in a RAID controller.

7. An apparatus comprising:
   means for connecting to a host computer through a drive controller interface;
   means for connecting to a first set of storage devices using a SAS protocol; and
   means for connecting to a second set of storage devices using a iSCSI protocol, wherein (i) said apparatus provides support for said SAS protocol and said iSCSI protocol to allow communication using both said SAS protocol and said iSCSI protocol through said drive controller interface and (ii) said communication is provided through a single drive controller interface, (iii) said apparatus implements support for both said SAS protocol and said iSCSI protocol by implementing (a) a mapping table to provide an equivalent SAS address of an iSCSI target, (b) a SAS to iSCSI frame translation module and (c) an iSCSI to SAS frame translation module.

8. A method for implementing a drive controller comprising the steps of:
   connecting a drive controller interface to a host computer;
   connecting a first port to a first set of storage devices using a SAS protocol; and
   connecting a second port to a second set of storage devices using a iSCSI protocol, wherein (i) said method provides support for said SAS protocol and said iSCSI protocol to allow communication using both said SAS protocol and said iSCSI protocol through said drive controller interface and (ii) said communication is provided through a single drive controller interface, (iii) said method implements support for both said SAS Protocol and said iSCSI protocol by implementing (a) a mapping table to provide an equivalent SAS address of an iSCSI target, (b) a SAS to iSCSI frame translation module and (c) an iSCSI to SAS frame translation module.

* * * * *